US010021670B1

(12) United States Patent
Bhatt et al.

(10) Patent No.: US 10,021,670 B1
(45) Date of Patent: *Jul. 10, 2018

(54) METHOD AND APPARATUS FOR NOTIFICATION CONTROL FOR A VEHICLE

(71) Applicant: MBIT WIRELESS, INC., Irvine, CA (US)

(72) Inventors: Falguni Bhatt, Irvine, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,052

(22) Filed: Mar. 7, 2017

(51) Int. Cl.
*H04M 3/42* (2006.01)
*H04W 68/00* (2009.01)
(Continued)

(52) U.S. Cl.
CPC ....... *H04W 68/005* (2013.01); *H04L 61/1594* (2013.01); *H04W 4/008* (2013.01);
(Continued)

(58) Field of Classification Search
CPC ......... G06F 2009/45595; G06F 9/5077; G06F 13/00; G06F 17/3023; G06F 17/30864; G06F 21/6218; G06F 17/30241; G06F 21/316; G06F 9/547; G06Q 30/02; G06Q 50/01; G06Q 10/063114; G06Q 10/06316; G06Q 10/0639; H05B 37/02072; H05B 33/0815; H05B 33/0851; H05B 37/04; H05B 41/28; H05B 37/0227; H05B 37/0245; H05B 37/0254; H05B 37/0281; H04B 5/0031; H04B 5/0043; H04B 1/0475; H04B 1/044; H04B 2001/0408; H04W 4/02; H04W 24/02; H04W 4/027; H04W 4/22; H04W 64/00; H04W 64/006;
(Continued)

(56) References Cited

U.S. PATENT DOCUMENTS 7,352,854 B1 * 4/2008 Silver ................ H04M 3/4288
379/207.16
2009/0170479 A1 * 7/2009 Jarenskog ......... H04M 1/72572
455/414.1
(Continued)

*Primary Examiner* — Nimesh Patel
(74) *Attorney, Agent, or Firm* — Lerner, David, Littenberg, Krumholz & Mentlik, LLP

(57) ABSTRACT

Modern mobile communication devices have a number of features that enable the users to stay connected with people in their contacts list. These mobile devices also keep the users informed about various events such as calls, text messages, emails, social media postings, etc. by providing various forms of notifications. The notifications may or may not be discreet. While the notifications of various events are useful, they may cause breach of privacy, may cause uncomfortable social situations, or may cause unsafe distraction under some conditions. These undesirable notifications in some scenarios may be controlled based on the awareness of the specific scenario in which the device user may be. A method and apparatus are disclosed that enable a user to control the notifications from a mobile communication device when used inside an automobile.

44 Claims, 8 Drawing Sheets

(51) Int. Cl.
*H04W 4/04* (2009.01)
*H04L 29/12* (2006.01)
*H04W 12/02* (2009.01)
*H04W 4/00* (2018.01)
*H04W 4/80* (2018.01)

(52) U.S. Cl.
CPC ............. *H04W 4/046* (2013.01); *H04W 4/80* (2018.02); *H04W 12/02* (2013.01)

(58) Field of Classification Search
CPC . H04W 72/048; H04W 76/007; H04W 76/02; H04W 4/023; H04W 4/08; G08G 1/0112; G08G 1/096775; G08G 1/096716; G08G 1/09675
See application file for complete search history.

(56) References Cited

U.S. PATENT DOCUMENTS

| | | | |
|---|---|---|---|
| 2014/0277935 A1* | 9/2014 | Daman | G08G 1/127 701/36 |
| 2015/0341755 A1* | 11/2015 | Choi | G09G 5/14 455/457 |
| 2015/0365787 A1* | 12/2015 | Farrell | H04W 4/02 455/456.1 |

* cited by examiner

METHOD AND APPARATUS FOR NOTIFICATION CONTROL FOR A VEHICLE

CROSS REFERENCE TO RELATED APPLICATIONS

This application is related to U.S. patent application Ser. No. 15/451,989, filed Mar. 7, 2017, the disclosure of which is hereby incorporated herein by reference.

BACKGROUND

The present disclosure relates generally to client terminals and particularly to mobile communication devices under different use cases.

Mobile communication devices may offer a wide range of functionality beyond basic voice calls. For example, the functionalities may include text messaging, Instant Messenger (IM) based messaging, mobile internet services, etc. In mobile communication devices such as smartphones and tablets, even more functionalities are integrated such as email, social networking, maps and navigation, and many other applications. In the present disclosure, the terms client terminal, Smartphone, cellular phone, tablet, or mobile communication device are used interchangeably. The various functionalities at the application level in the client terminal may be supported by different underlying Wireless Wide Area Network (WWAN) technologies. For example, the mobile communication capability for voice call and internet may be provided by a Long Term Evolution (LTE) system of 3rd Generation Partnership Project (3GPP), or by Wideband code division Multiple Access (WCDMA) system of 3GPP, etc. Alternatively, Wireless Local Area Network (WLAN), also commonly known as Wi-Fi, based on the Institute of Electrical and Electronics Engineers (IEEE) 802.11 family standards may be used for wireless communication.

The increased functionality of client terminals has led to a common scenario where users are connected to their contacts and to the local, regional, and global events almost all the time. Any event update by any of the applications running in a client terminal may be notified to a user in different ways such as an audible incoming call ringing sound, vibrations, notification beeps and other sounds, flashing display, etc. The various methods of notifying an event to a user are collectively referred herein as event notification alerts. In some cases the notification may include the announcement of the name and phone number for the incoming call. Similarly, in case of text messages, other messages, or emails, the messages may be read aloud by the client terminals.

Bluetooth™ is a short range wireless communication technology. It nominally works in the range of few meters. The use of Bluetooth has become widespread in conjunction with client terminals for safety and convenience purposes. For example, in many parts of the world, it may be illegal to use a client terminal for making a call or texting directly while driving. In such cases, however, a user may continue to use a client terminal with Bluetooth based headset containing microphone, speaker and basic call control buttons. Example block diagrams showing only high level relevant blocks of a client terminal and a Bluetooth headset are shown in FIG. 1 for a typical use case. The integration of client terminals with vehicles, such as automobiles, has also become widespread. For example, an Automobile Head Unit (AHU) in many automobiles have built-in Bluetooth technology to interface with a user's client terminal as illustrated in FIG. 2 with an example block diagram showing only high level relevant blocks. In another example, a WWAN modem and other functionalities of a client terminal itself may be integrated into an AHU as illustrated in FIG. 2a.

Making the initial connection between a client terminal and a Bluetooth device is often referred to as pairing the two devices. Once a client terminal and a Bluetooth device are paired, they begin to communicate with each other autonomously when they are in vicinity of each other.

Bluetooth profiles are additional protocols that execute on top of the baseline Bluetooth standard protocols to more specifically define the type of data and how the data is to be used by Bluetooth capable devices that may communicate with each other. For example, the Hands-Free Profile (HFP) may be commonly used to allow client terminals to communicate with hands-free kits in an automobile, i.e., AHU. In another example, the Phone Book Access Profile (PBAP) may be commonly used to allow exchange of Phone Book information between Bluetooth devices. PBAP may be used between an AHU in an automobile and a client terminal, for example, to allow the AHU to display the name of the incoming caller and to allow the AHU to download the phone book so the user can initiate a call from the AHU display.

A commonly used feature of a Bluetooth enabled AHU in an automobile is to enable the driver to make and receive handsfree calls. The incoming call sound may be routed to the speakers built into the automobile and the driver's voice may be picked up by microphones placed strategically inside the automobile. This frees up the driver to focus attention on driving the automobile and reduces distraction due to the use of client terminal. Another common feature of a Bluetooth enabled AHU in an automobile is to read aloud the incoming text messages. This enables the driver to avoid having to read the incoming text messages which may take attention away from driving. In a similar manner, a number of other incoming messages such as emails, social media posts, etc. may be read aloud.

Bluetooth enables the transfer of not only the call audio signals between client terminal and the Bluetooth device but also many other types of information such as the caller name and phone number may be transferred over the Bluetooth link. In another example, the entire address book and call history may be transferred from the client terminal to the Bluetooth device. Most client terminals allow the user the flexibility to enable or disable the various features described above.

While Bluetooth enables any client terminal, capable of Bluetooth, to be integrated with a Bluetooth enabled AHU in an automobile, other methods may be used for interfacing a client terminal with the AHU in the automobile. For example, a client terminal may be connected to the AHU using a Universal Serial Bus (USB) connector. In another example, a Lightning® connector may be used to connect a client terminal to the AHU. In another example, an automobile may have a built-in client terminal directly interfacing with the rest of the electronic subsystems in the AHU. In some cases, the same phone number may be used for the built-in client terminal in an automobile and the user's mobile client terminal. When the client terminal is inside an automobile, all the communications may be transferred over to the built-in client terminal. Similarly, when the user leaves the automobile, the communications may be migrated back from the built-in client terminal to the mobile client terminal.

Sometimes when a user (driver) is with one or more passengers in an automobile, and the user receives an incoming call from someone, and the caller's name and number or both are announced by the Bluetooth enabled AHU, a couple of issues may arise. First, the fact that a particular caller called the user becomes known to the other passengers in the automobile. Second, the phone number of the caller becomes known to the other passengers in the automobile. This may not be desirable from the user's perspective and it may not be desirable from the caller's perspective as well. Also it may not be desirable from the passenger's perspective. There may be different social relationship dynamic between different pairs of people within a group of people. Therefore, the announcement of the name and phone number of the caller may present a socially awkward situation. If the incoming text messages or messages from other sources such as email, social media, etc. are read aloud the situation may be further exacerbated.

When a user is using the navigation system, either the one in the client terminal or the one built-in the AHU, it may be even more important for the user to focus on driving since the user may be in an unfamiliar area. Under such conditions, it may be desirable to avoid any incoming calls being announced, and to avoid text messages, or any other type of messages being read aloud.

There is a need for a means to judiciously balance the use the technology in the AHU of an automobile to assist the driver to focus on driving while using a client terminal and the need to maintain the privacy when required.

SUMMARY

A method and apparatus are disclosed that enable a user to use a client terminal in an automobile while using its safety and convenience features of Bluetooth enabled AHU but maintaining privacy when deemed necessary.

In accordance with an aspect of the present disclosure, a method for controlling a notification at a first device, in which the first device is of a wireless communication network and installed in a vehicle, may include controlling, by a processing device at the first device, setting at least one group of contacts; setting a selected preconfigured action, among a plurality of preconfigured actions, to be taken by the first device when a predetermined type of communication is received at the first device from any contact of the at least one group of contacts; receiving information indicating presence of a passenger in the vehicle; and when the predetermined type of communication from any contact of the at least one group of contacts is received at the first device from the wireless communication network, notification control for the first device according to the selected preconfigured action and the information indicating presence.

In one alternative, the predetermined type of communication may be an incoming call or text.

In one alternative, the plurality of preconfigured actions may include a first preconfigured action to disable announcement and display of incoming caller information and enable an option to accept or ignore a call, a second preconfigured action to reject the call with an autonomous text message response, and a third preconfigured action to route the call to voicemail.

In one alternative, the method may include controlling, by the processing device, adding a first contact to a first group of contacts of the at least one group of contacts, removing a second contact from the first group, modifying a third contact of the first group, deleting the first group or adding another group of contacts to the at least one group of contacts.

In one alternative, the method may include controlling, by the processing device, when a new contact is added to a contacts list at the first device, generating at the first device a prompt requesting a response by a user of the first device whether to add the new contact into any group of the at least one group of contacts.

In one alternative, the vehicle may be an automobile and the information indicating presence may be based on second information indicating passenger presence from a second device which is installed in the automobile.

In one alternative, the second information indicating passenger presence may be communicated over a direct interface between the first device and the second device.

In one alternative, the method may include controlling, by the processing device, when the information indicating presence indicates no other passenger is in the automobile, enabling caller name and number announcements and reading a predetermined incoming message aloud, and when the information indicating presence indicates another passenger is in the automobile, enabling caller name and number announcements and reading the predetermined incoming message aloud only when an incoming call or message is from any contact of a first group of contacts of the at least one group of contacts, wherein the first group is associated with a selected first preconfigured action of performing caller name and number announcements and reading the predetermined incoming message aloud.

In one alternative, the method may include controlling, by the processing device, determining whether another passenger is present in the automobile periodically based on the information indicating presence.

In one alternative, the method may include controlling, by the processing device, determining whether another passenger is present in the automobile based on an automobile door open close event notification indicated in the information indicating presence.

In one alternative, the information indicating presence may indicate at least one of a position of a gear shifter of the vehicle or running state of an engine of the vehicle.

In one alternative, the method may include controlling, by the processing device, when information indicating activation of a navigation system of the vehicle with a predetermined destination is determined to be indicated in the information indicating presence, activation of selective announcement of an incoming call and reading a predetermined incoming message aloud when a user of the first device is an only occupant in the vehicle.

In one alternative, the information indicating presence may indicate use, by an occupant in a rear seat of the vehicle, of the first device for rendering an entertainment program.

In one alternative, the information indicating presence may indicate at least one of an external environmental condition or an internal environmental condition of the vehicle.

In one alternative, the at least one group of contacts may include first and second groups of contacts, wherein the first group is associated with a first selected preconfigured action to control announcement of an incoming call and reading a predetermined incoming message aloud based on privacy, and wherein the second group is associated with a second selected preconfigured action to control announcement of the incoming call and reading the predetermined incoming message aloud based on whether a navigation system of the vehicle is in use.

In one alternative, the at least one group of contacts may include third and fourth groups of contacts, wherein the third group includes is associated with a third selected preconfigured action to control announcement of the incoming call and reading the predetermined incoming message aloud when a name or originating source of the incoming call or the predetermined incoming message is not determinable at the first device, and wherein the fourth group includes is associated with a fourth selected preconfigured action to control announcement of the incoming call and reading the predetermined incoming message aloud when a determination is the incoming call or the predetermined incoming message is from an international phone number.

In one alternative, the incoming call or the predetermined incoming message may be determined to be from an international phone number based on a country code of a given mobile network from which the first device is receiving wireless communication service and a comparison of the country code of the given mobile network with a country code of the incoming call or the predetermined incoming message.

In one alternative, the method may include controlling, by the processing device, receiving, as input from a user of the first device, information indicating a group type of passengers in the vehicle; and the notification control for the first device according to the selected preconfigured action, based on the group type.

In one alternative, the method may include controlling, by the processing device, determining, at each vehicle door open and close event or gear shifter being in a parking position event indicated in the information indicating presence, passenger occupancy in the vehicle and type of group of passengers.

In one alternative, a first notification control for the first device may be performed according to a first selected preconfigured action associated with a first group of contacts of the at least one group of contacts, and the method may include controlling, by the processing device, when an incoming call or a predetermined incoming message is received at the first device from a contact belonging to the first group, performing the first notification control for the first device, and generating at the first device a notification indicating a determination that an incoming call or a predetermined incoming message belongs to the first group and criteria of the first selected preconfigured action.

In one alternative, the method may include controlling, by the processing device, when the notification is generated, generating at the first device a second notification indicating an option to override the first notification control.

In one alternative, the method may include controlling, by the processing device, generating a decision table for determining a first notification control for the first device, the decision table being based on (1) first information from a user of the first device about a plurality of groups of contacts and respective associated selected preconfigured actions, (2) second information about at least one of passenger occupancy, a door open/close event, an engine start/stop event, gear shifter position or status of use of a navigation system or entertainment system, (3) third information from the internet about an external environmental factor, and (4) fourth information about safety and operational condition of the vehicle.

In one alternative, the decision table may include priority information for each of the first information, the second information, the third information and the fourth information.

In one alternative, the first notification control may be determined in accordance with the first information, the second information, the third information and the fourth information and the priority information respectively of the first information, the second information, the third information and the fourth information, and the method may include controlling, by the processing device, performing the first notification control for the first device.

In one alternative, the method may include controlling, by the processing device, notifying, at the first device, information about the first notification control and a second notification indicating an option to override the first notification control.

In one alternative, the information indicating presence may include sensor information from a sensor of a passenger seat of the vehicle, in which the sensor information indicates whether a passenger is occupying the passenger seat.

In one alternative, the sensor may include at least one of a weight sensor or a second sensor for detecting whether a seatbelt is fastened to a buckle.

In one alternative, the method may include controlling, by the processing device, determining, based on the sensor information, whether a passenger or non-human load is in the passenger seat.

In one alternative, the method may include controlling, by the processing device, determining a non-human load is in the passenger seat when, based on the sensor information, at least a predetermined weight is detected as being in the passenger seat and a seat belt of the passenger seat is determined not to be fastened to a buckle, and determining a given passenger is in the passenger seat when, based on the sensor information, at least a predetermined minimum weight is detected as being in the passenger seat and a seat belt of the passenger seat is determined to be fastened to the buckle.

In one alternative, the notification control for the first device may be controlled, when a second device of the wireless communication network is determined to be communicatively coupled with the first device via a communication link.

In one alternative, the communication link may be a Bluetooth link.

In accordance with an aspect of the present disclosure, a method for controlling a notification at a first device, in which the first device is installed in a vehicle and configured for communicatively coupling to a client device of a wireless communication network over a first communication link and to a second wireless communication network over a second communication link, may include controlling, by a processing device at the first device, acquiring, over the first communication link, user identification information from the client device; acquiring, over the second communication link, at least one group of contacts using the user identification information; setting a selected preconfigured action, among a plurality of preconfigured actions, to be taken by the first device, when caller information received from the client device over the first communication link indicates a predetermined type of communication is received at the client device from any contact of the at least one group of contacts; receiving information indicating presence of a passenger in the vehicle; and when the predetermined type of communication from any contact of the at least one group of contacts is determined to be received at the client device from first caller information received from the client device over the first communication link, notification control for the first device according to the selected preconfigured action and the information indicating presence.

In one alternative, the user identification information may include at least one of a phone number, an email address or password.

In one alternative, the first communication link may be over a Bluetooth link or a wired link, and the second communication link may be over a Wireless Wide Area Network (WWAN) link.

In one alternative, the at least one group of contacts may be acquired over the Internet.

In one alternative, the method may include controlling, by the processing device at the first device, periodically updating the at least one group of contacts, by periodically accessing over the second communication link, using the user identification information, information indicating the at least one group of contacts.

In one alternative, the method may include controlling, by the processing device at the first device, modifying the at least one group of contacts, based on information from interaction by a user with a user interface device of the first device.

In one alternative, the user interface device may be a touch screen.

In one alternative, the vehicle may be an at least partially autonomous automobile or a non-autonomous automobile.

In one alternative, the information indicating presence may be based on second information indicating passenger presence from a second device which is installed in the vehicle.

In accordance with an aspect of the present disclosure, an apparatus for controlling a notification at a first device, in which the first device is of a wireless communication network and installed in a vehicle, may include circuitry configured to control, at the first device, setting at least one group of contacts; setting a selected preconfigured action, among a plurality of preconfigured actions, to be taken by the first device when a predetermined type of communication is received at the first device from any contact of the at least one group of contacts; receiving information indicating presence of a passenger in the vehicle; and when the predetermined type of communication from any contact of the at least one group of contacts is received at the first device from the wireless communication network, notification control for the first device according to the selected preconfigured action and the information indicating presence.

In accordance with an aspect of the present disclosure, a wireless communication device may include a receiver to receive a signal from a wireless communication network; and a processing device configured for controlling a notification at the wireless communication device, in which the wireless communication device is installed in a vehicle, wherein the processing device may be configured to control: setting at least one group of contacts; setting a selected preconfigured action, among a plurality of preconfigured actions, to be taken by the wireless communication device when a predetermined type of communication is received at the wireless communication device from any contact of the at least one group of contacts; receiving information indicating presence of a passenger in the vehicle; and when the predetermined type of communication from any contact of the at least one group of contacts is received at the wireless communication device from the wireless communication network, notification control for the wireless communication device according to the selected preconfigured action and the information indicating presence.

In accordance with an aspect of the present disclosure, an apparatus for controlling a notification at a first device, in which the first device is installed in a vehicle and configured for communicatively coupling to a client device of a wireless communication network over a first communication link and to a second wireless communication network over a second communication link, may include: circuitry configured to control, at the first device, acquiring, over the first communication link, user identification information from the client device; acquiring, over the second communication link, at least one group of contacts using the user identification information; setting a selected preconfigured action, among a plurality of preconfigured actions, to be taken by the first device, when caller information received from the client device over the first communication link indicates a predetermined type of communication is received at the client device from any contact of the at least one group of contacts; receiving information indicating presence of a passenger in the vehicle; and when the predetermined type of communication from any contact of the at least one group of contacts is determined to be received at the client device from first caller information received from the client device over the first communication link, notification control for the first device according to the selected preconfigured action and the information indicating presence.

In accordance with an aspect of the present disclosure, a wireless communication device may include a receiver to receive a signal from a wireless communication network; and a processing device configured for controlling a notification at the wireless communication device, in which the wireless communication device is installed in a vehicle and configured for communicatively coupling to a client device of a wireless communication network over a first communication link and to a second wireless communication network over a second communication link, wherein the processing device may be configured to control acquiring, over the first communication link, user identification information from the client device; acquiring, over the second communication link, at least one group of contacts using the user identification information; setting a selected preconfigured action, among a plurality of preconfigured actions, to be taken by the wireless communication device, when caller information received from the client device over the first communication link indicates a predetermined type of communication is received at the client device from any contact of the at least one group of contacts; receiving information indicating presence of a passenger in the vehicle; and when the predetermined type of communication from any contact of the at least one group of contacts is determined to be received at the client device from first caller information received from the client device over the first communication link, notification control for the wireless communication device according to the selected preconfigured action and the information indicating presence.

DETAILED DESCRIPTION

Figure 1:
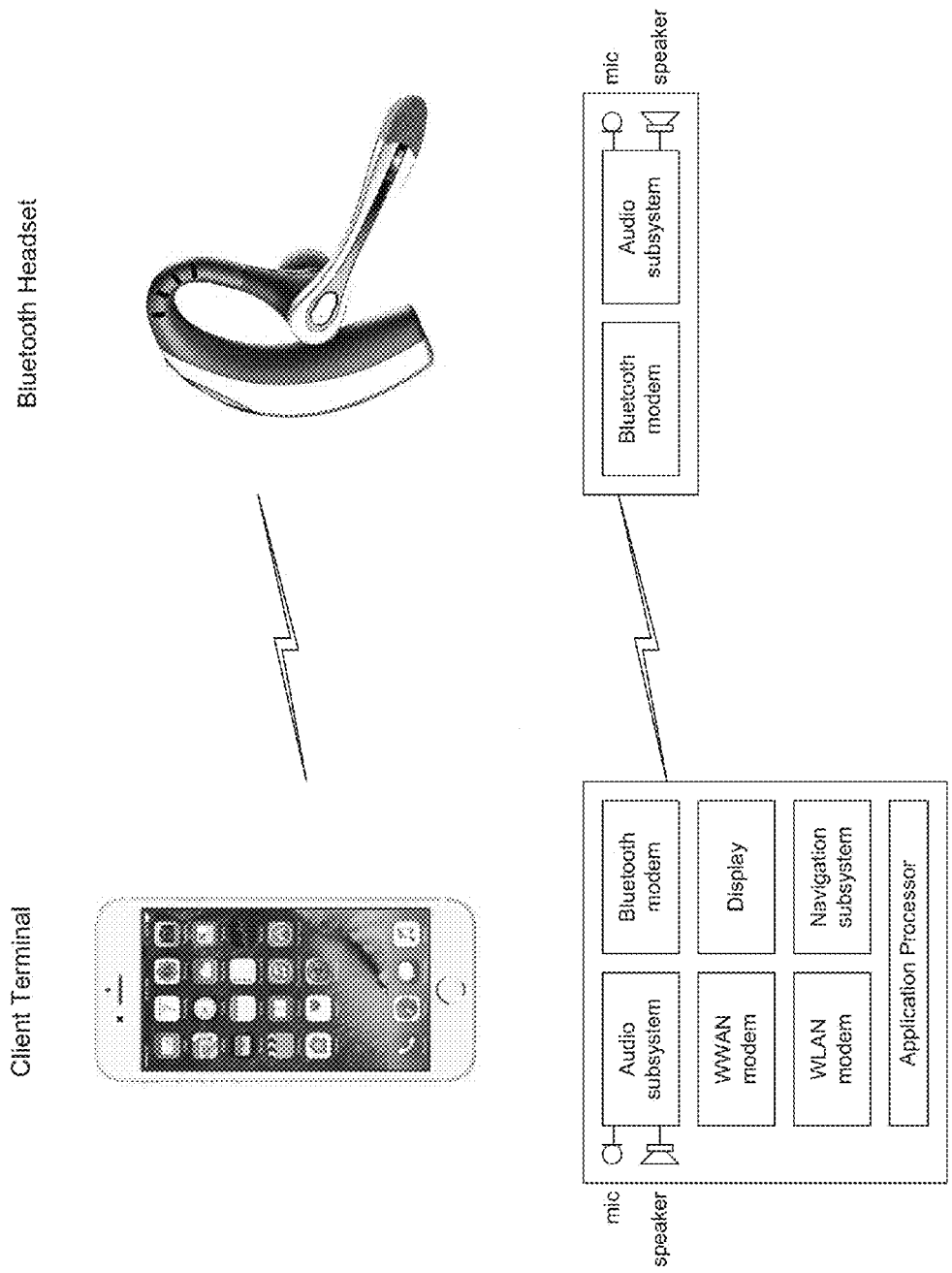
FIG. 1 illustrates a client terminal communicating with a Bluetooth enabled headset.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Client terminals have a user interface and a method to maintain the list of people in their contacts. The list may have a number of attributes such as name, mobile phone number, work phone number, home phone number, email address, etc. There may be other configurable features such as the type of ringtone to play whenever a call or message from a particular contact is received. Another configurable feature may be the grouping of contacts. For example, each contact may be added to one or more groups, such as "Family", "Friends", "Co-worker", "Business Groups", etc.

According to an aspect of the present disclosure, a new group of contacts, referred herein as TYPE_1 group, may be created in a client terminal and this grouping of contacts may be made available to the Bluetooth enabled AHU of the automobile. According to an aspect of the present disclosure, if the client terminal is paired with the Bluetooth enabled AHU of the automobile, and if there is an incoming call or text message from anyone in the TYPE_1 group of contacts to the client terminal, a preconfigured action may be taken by the client terminal. According to an aspect of the present disclosure, a first preconfigured action may be to disable the announcement and display of the incoming caller information and enable the user with an option to accept the call or ignore the call. According to an aspect of the present disclosure, a second preconfigured action may be to reject the call with an autonomous text message response, for example, indicating that the user will call back the caller later. According to an aspect of the present disclosure, a third preconfigured action may be to route the caller to the user's voicemail. According to an aspect of the present disclosure, additional actions may be configurable. According to an aspect of the present disclosure, the user may create the new group once and may periodically, or as and when needed, may add, remove, or change the contacts that belong to the new group. According to an aspect of the present disclosure, the user may entirely delete the new group. According to an aspect of the present disclosure, the user may create another new group. According to an aspect of the present disclosure, whenever a new contact is added to the contacts list, the user may be prompted to decide whether to assign the new contact into one or more of the new groups.

Modern automobiles have a number of sensors. For example, many automobiles have a sensor to detect whether there is anyone seating in the front passenger seat. For example, this may be used to detect whether to enable Supplemental Restraint System (SRS) or not depending on the weight of the seat occupant. There may be other sensors in an automobile to detect the presence of other passengers in an automobile. For example, if a seatbelt is fastened to its buckle and if the detection mechanism for fastening to the buckle is installed, it may be possible to detect, with reasonable accuracy, the presence of one or more occupants in an automobile.

According to an aspect of the present disclosure, the built-in electronics technology in the automobile may communicate the information about the presence of other passengers in the automobile to the Bluetooth enabled AHU. According to an aspect of the present disclosure, the client terminal may receive the information about the presence of other passengers in the automobile over Bluetooth. According to an aspect of the present disclosure, the client terminal may receive the information about the presence of other passengers in the automobile over USB or Lightning connector. According to an aspect of the present disclosure, a built-in client terminal of an automobile may receive the information about the presence of other passengers in the automobile over a direct interface between the different electronics subsystems of the automobile. According to an aspect of the present disclosure, if the client terminal receives the information from the automobile that there are no other passengers in the automobile, then the client terminal may enable the caller name and number announcements and reading aloud of text messages and other messages. According to an aspect of the present disclosure, if the client terminal receives the information from the automobile that there are other passengers in the automobile, then the client terminal may only enable the caller name and number announcements and reading aloud of text messages and other messages if the incoming call or message is from a contact belonging to the group for which such an action is preconfigured.

According to an aspect of the present disclosure, the determination of the presence of other passengers may be periodically updated based on a configurable timer. According to an aspect of the present disclosure, the determination of the presence of other passengers may be updated based on the automobile door open close event notification from the AHU of the automobile to the client terminal.

According to an aspect of the present disclosure, the groups based notification control aspects of the present disclosure may be controlled based on receiving a notification from the AHU about the position of the gear shifter of the automobile. For example, the group based notification control aspects of the present disclosure may be disabled when the gear shifter is in park position and may be enabled when the gear shifter is in any other position. According to an aspect of the present disclosure, the groups based notification control aspects of the present disclosure may be controlled based on a receiving notification from the AHU about whether the engine of the automobile is running or not. For example, the group based notification control aspects of the present disclosure may be disabled when the engine is not running and may be enabled when the engine is running. According to an aspect of the present disclosure, the groups based notification control aspects of the present disclosure may be controlled based on a receiving a combination of engine and gear shifter information from the AHU. For example, if the engine is running but the gear shifter is in park position, the group based notification control aspects of the present disclosure may be disabled.

According to an aspect of the present disclosure, when a user has activated the navigation system with a specific destination on the built-in navigation system of the automobile, the client terminal may receive this information from the automobile over the Bluetooth link, USB connection or Lightning connection. According to an aspect of the present disclosure, the client terminal may use the information about the active use of the navigation system in the automobile to activate the selective announcement of incoming calls, reading aloud of text messages and other messages even if the user is the only occupant in the automobile. According to an aspect of the present disclosure, if the navigation system on the client terminal is used with a specific destination, the client terminal uses this information to activate the selective announcement of incoming calls, reading aloud text messages and other messages even if the user is the only occupant in the automobile.

According to an aspect of the present disclosure, a client terminal may consider use of additional conditions in making determination about group based notification control. According to an aspect of the present disclosure, if the AHU is used by the occupants in the rear seats of the automobile for audio, video, or other entertainment programs, the client terminal may use this information from the AHU to determine that certain group based notification control may be enabled or disabled.

According to an aspect of the present disclosure, a client terminal may use external environmental conditions in making determination about group based notification control. For example, the client terminal may receive information about weather conditions such as rain snow, wind, visibility, presence or absence of daylight, etc. which can be used for group based notification control. For example, under heavy rain, snow or wind, notification of calls and text messages from certain groups may be disabled. In another example of external environmental factors, information about accidents, road hazards, lane closures, traffic, etc. may be used for group based notification control. The information about the external environmental conditions may be obtained by the client terminal from internet and/or from the AHU of the automobile which may also have internet access and integrated rain and other sensors. The information about the external environmental conditions may also be provided by the user to the client terminal.

According to an aspect of the present disclosure, client terminal may use internal environmental conditions in making determination about group based notification control. For example, the client terminal may receive information from AHU about the diagnostics of the automobile which may include, for example, low tire pressure, traction control activation, condition of brakes, etc. For example, if potentially dangerous conditions are indicated by the AHU, the client terminal may override other criteria and may disable the notification incoming calls, text messages, and other messages.

According to an aspect of the present disclosure, there may be two different new groups for selectively enabling the announcement of incoming calls, and reading aloud of text messages and other messages. According to an aspect of the present disclosure, a first new group of contacts, namely TYPE_1 group, may correspond to contacts whose announcement is controlled based on privacy aspect. According to an aspect of the present disclosure, a second new group of contacts, namely TYPE_2 group, may correspond to contacts whose announcement is controlled based on the need for increased attention required on driving when navigation is in use.

According to an aspect of the present disclosure, there can be additional new groups of contacts such as TYPE_3 group, TYPE_4 group, etc. to support the notification control based on various aspects of the present disclosure. For example, the incoming calls or text messages for which the name or the phone number of the originating source is not known to the client terminal and not known to the AHU of the automobile, may be treated as a separate group, e.g., TYPE_3, and the notification for calls and text messages from that group may be handled as per the action preconfigured by the user for that group of contacts. In another example, the incoming calls or text messages that originate from an international phone number may be treated as a separate group, e.g., TYPE_4, and the notification for calls and text messages from that group may be handled as per the action preconfigured by the user for that group of contacts. According to an aspect of the present disclosure, the determination of what is an international call or text message may be based not on the client terminal's own phone number but rather on the country code of the mobile network from which it may be getting mobile service and its comparison with the country code of the incoming call. Therefore, for example, if a user travels to another country, the calls from the user's home country may be treated as international calls.

According to an aspect of the present disclosure, the user may input to the client terminal the group type of passengers in the automobile. This enables a more granular control of the notifications. For example, even if the client terminal receives information from the AHU that there are other occupants present in the automobile, the user can input that the occupants belong to a family group or a friends group or a business group. According to an aspect of the present disclosure, the client terminal uses the information input by the user to make decisions based on the specific group indicated by the user. According to an aspect of the present disclosure, the client terminal continues to reevaluate the passenger occupancy and the type of group at each automobile door open and close event or gear shifter being in parking position event.

According to an aspect of the present disclosure, when a client terminal receives a call or a text message or any other type of message from a contact belonging to a certain group and the client terminal takes the preconfigured action for that group, it may still notify the user about its determination and the criteria on which the determination was based. For example, the client terminal may notify, on the client terminal display or the AHU display or by sound, that a call from a contact belonging to GROUP_1 was not notified based on the pre-configuration to do so. According to an aspect of the present disclosure, when the client terminal notifies about its action, it may still offer the user the option to override the action taken by the client terminal. For example, if the client terminal had determined that a call from a contact in TYPE_1 group was not to be notified, it may give, when possible, an option to the user to do one of the following: (1) announce the caller's name and phone number or (2) accept the call without announcement (3) announce the caller's name and phone number and then wait for the user to decide whether to accept the call or not.

Figure 3:
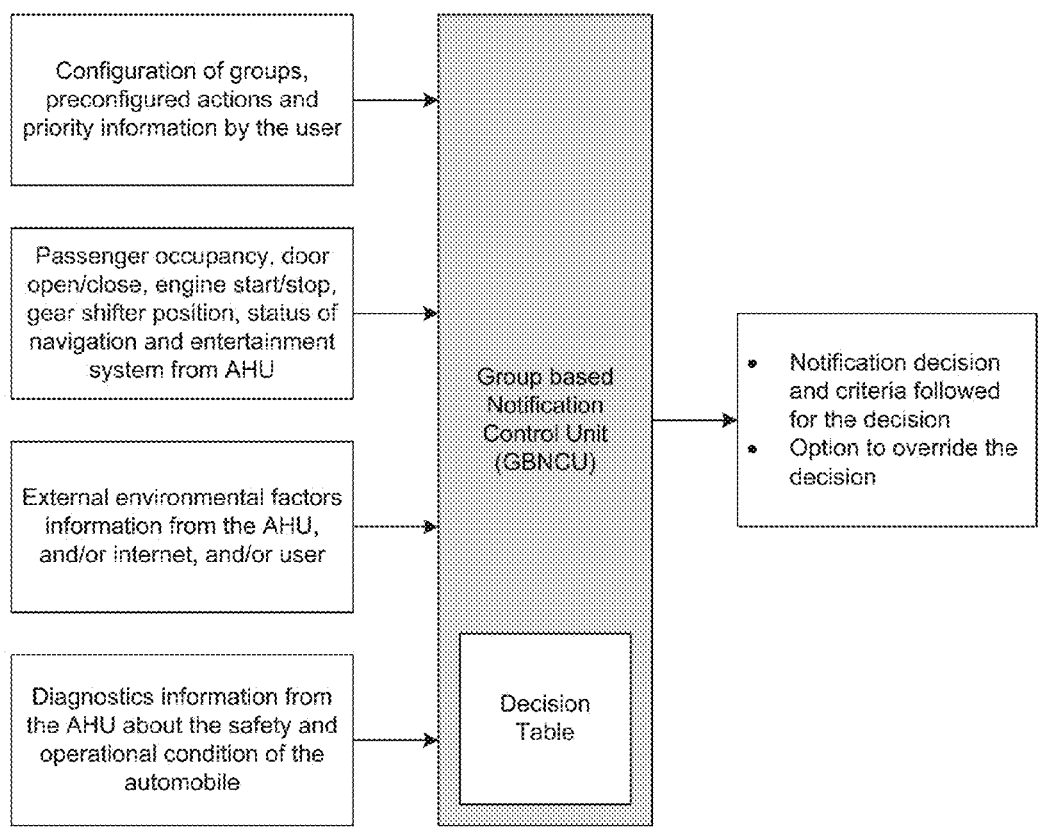
FIG. 3 illustrates a block diagram of a Group based Notification Control Unit inside a client terminal in accordance with the aspects of the present disclosure.

According to an aspect of the present disclosure, the Group Based Notification Control Unit (GBNCU) inside the client terminal prepares a Decision Table, as illustrated in FIG. 3, based on the following inputs: (1) the information from the user about the various groups and the preconfigured actions for each group, (2) the input information from AHU about the passenger occupancy, door open/close events, engine start/stop events, gear shifter position, status of the use of navigation system, entertainment system, etc., (3) the information from the AHU and internet about the external environmental factors, and (4) the diagnostics information from the AHU about the safety and operational condition of the automobile. The Decision Table may include consideration for different prioritization for each of the input to the GBNCU in the client terminal. Based on these inputs and priorities, the GBNCU may make a determination on a course of action and then executes the action. It also may notify to the user about the decision and the criteria followed for that decision and provide an option for the user to override the decision.

Figure 4:
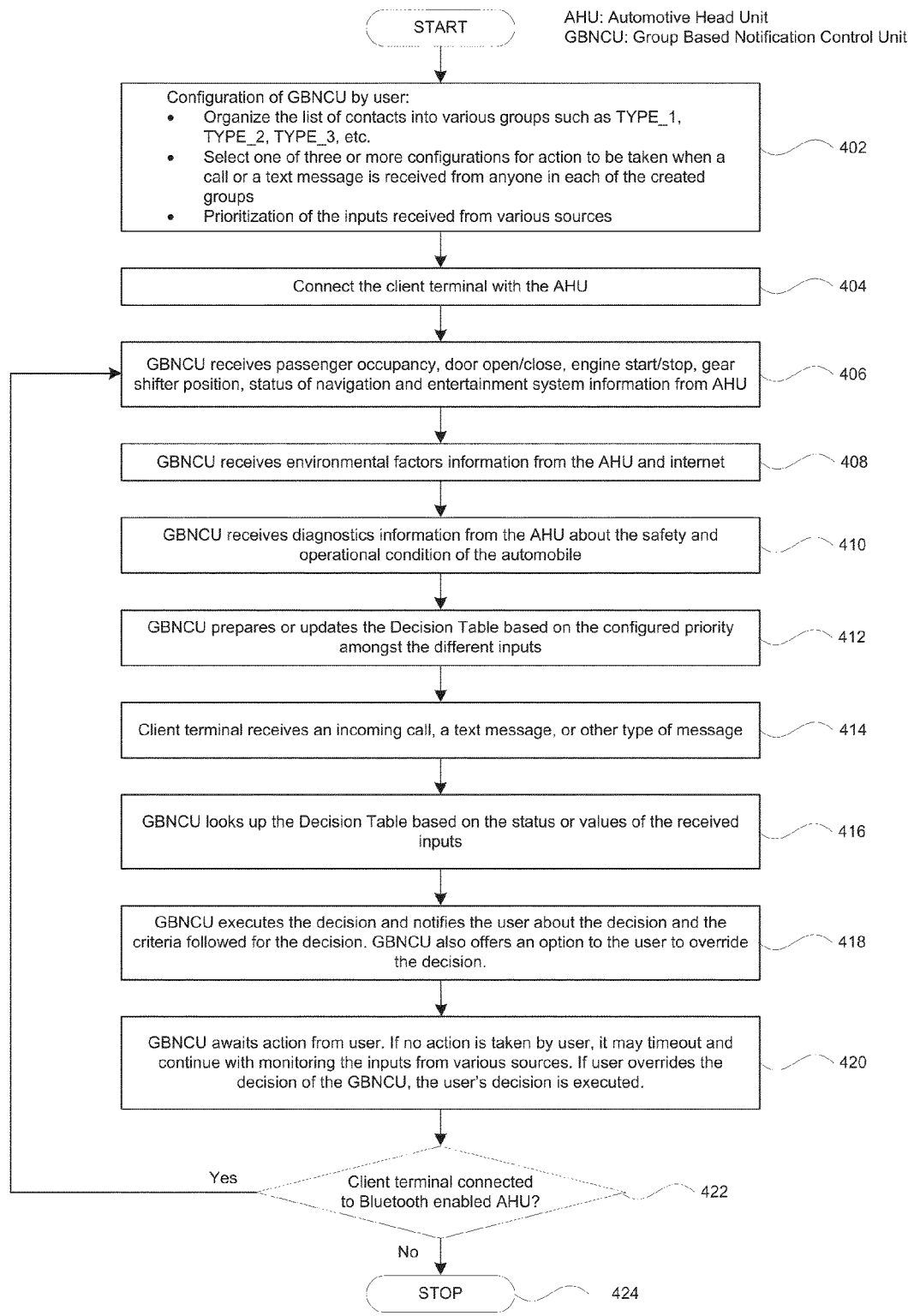
FIG. 4 illustrates an exemplary flow chart for processing steps in accordance with some of the aspects of the present disclosure.

The flow diagram 400 contained in FIG. 4 illustrates an exemplary group based notification control method according to various aspects of the present disclosure. At processing stage 402, the GBNCU inside the client terminal may be configured by the user with various pieces of information as follows. First, the list of contacts in the client terminal is organized by the user into various groups such as TYPE_1, TYPE_2, TYPE_3, etc. Second, for each group of contacts, one of the three or more preconfigured actions is selected for the action to be taken when a call, text message or any other type of message is received from anyone in each of the created groups. Third, priority is provided for each of the inputs received from various sources such as the user configuration and the inputs from the AHU. For example, the knowledge of the presence of other passengers in the automobile may have the highest priority in determining the action. Next at processing stage 404, the client terminal may be connected with the AHU, for example via Bluetooth. Alternatively, the client terminal may be connected to the AHU via USB or Lightning cable. Next at processing stage 406, the GBNCU receives the passenger occupancy, door open/close, engine start/stop, gear shifter position, status of navigation and entertainment system information from the AHU. Next at processing stage 408, the GBNCU receives environmental factors information, such as rain, visibility, etc. from the AHU and internet and/or from the user. Next at processing stage 410, the GBNCU receives diagnostics information from the AHU about the safety and operational condition of the automobile. Next at processing stage 412, the GBNCU prepares or updates the Decision Table based on the received inputs and the configured priorities amongst the different inputs from various sources. Next at processing stage 414, the client terminal may receive an incoming call, a text message, or other type of message. Next at processing stage 416, the GBNCU looks up the Decision Table based on the status or values of the received inputs. Next at processing stage 418, the GBNCU executes the decision and notifies the user about the decision and the criteria followed to reach that decision. The GBNCU also offers an option to the user to override the decision. Next at processing stage 420, the GBNCU awaits action from user. If no action is taken by user, the GBNCU may timeout and continue with monitoring the inputs from various sources. If user overrides the decision of the GBNCU, the user's decision is executed by the GBNCU. Next at processing stage 422, a determination is made whether the client terminal is still connected to the AHU or not. If the client terminal is still connected to the AHU, the processing returns to the processing stage 406. If the client terminal is not connected to the AHU, the processing suitably terminates at stage 424.

Multiple client terminals may be paired via Bluetooth link with the AHU of the automobile. However, only one client terminal may be actually connected via Bluetooth link with the AHU. The aspects of the present disclosures are applied as per the settings in the specific client terminal that may be connected to the AHU at any given time.

Although the AHU is used in this disclosure for interfacing and interacting with the client terminal, there may be another processing or control unit in the automobile which may interface and/or interact with the client terminal.

Figure 2:
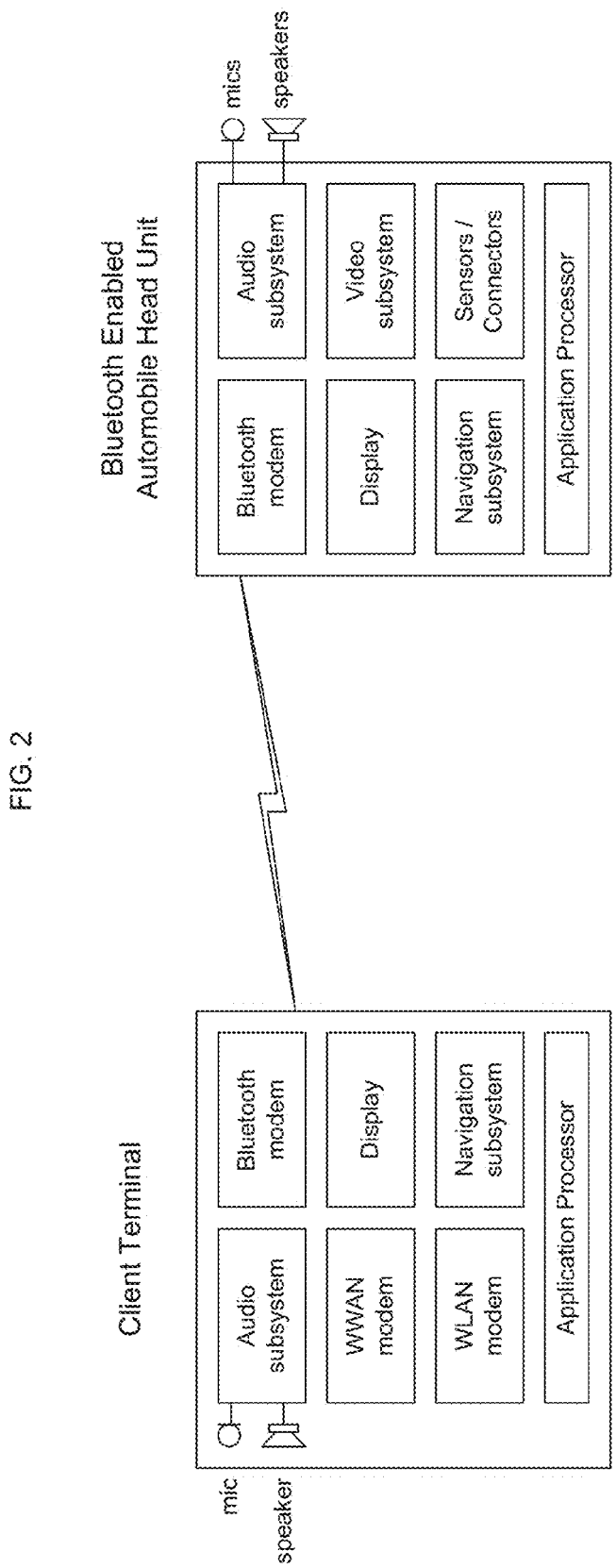
FIG. 2 illustrates a client terminal communicating with a Bluetooth enabled Automotive Head Unit (AHU) in an automobile.

The above-described method may be implemented in an AHU. In a first embodiment, group based notification control method may be implemented in an AHU without a built-in WWAN modem as shown in FIG. 2. In this embodiment, after the client terminal and the AHU are connected over the Bluetooth link, the AHU may first use the PBAP profile to get the information about all the contacts and their groupings from the phone book of the client terminal. The transfer of information about all the contacts from client terminal to AHU may be performed only once for each time a client terminal is connected to the AHU. If a client terminal is disconnected from the AHU and connected again with it over Bluetooth, the PBAP profile may be used again to transfer the contacts information from client terminal to the AHU. This enables the AHU to receive the most current contacts information including any newly added contacts, newly formed groups, or modified groups. Some client terminals and AHU may support incremental transfer of only the changes from previous transfer of contacts information using PBAP profile and the current transfer of contacts information. Subsequently, when an incoming call or message is received by the client terminal, the caller information is transferred from client terminal to the AHU. Next the AHU, using the previously received information about all the contacts and their groupings, performs the group based notification control according to the aspects of the present disclosure for calls and messages that may be received using the HFP profile over the Bluetooth connection.

In the first embodiment, as an alternative to Bluetooth connection, the AHU may be connected to the client terminal over USB, Lightning or any other type of wired or wireless link. The transfer of the contacts information and the calls and messages may be performed over this connection to enable the AHU to perform the group based notification control according to the aspects of the present disclosure.

Figure 2A:
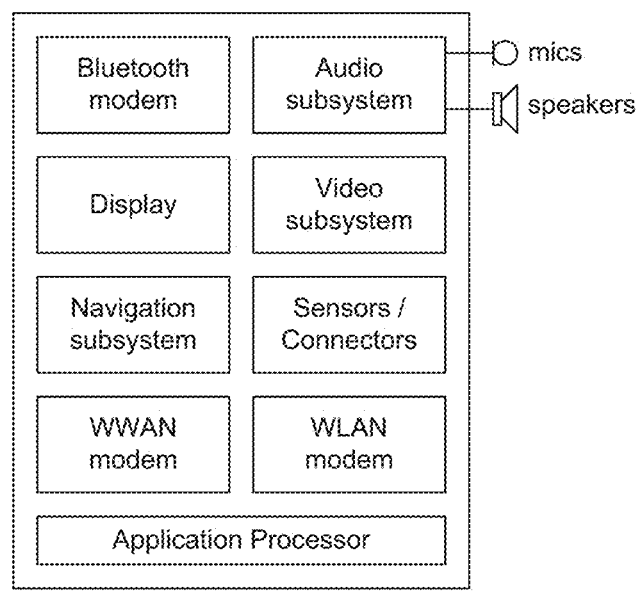
FIG. 2*a* illustrates an AHU with a built-in Wireless Wide Area Network (WWAN) modem in an automobile.

In a second embodiment, the group based notification control method may be implemented in an AHU which includes a built-in WWAN modem as shown in FIG. 2a. In this embodiment, according to an aspect of the present disclosure, the AHU may provide a means to get the user's information such as phone number, email address, password, etc. from the user. According to an aspect of the present disclosure, the AHU may connect to internet and log into the user's email and may download the user's contacts list that is associated with the user's phone number. According to an aspect of the present disclosure, the AHU may periodically synchronize with the user's contacts list using internet on a periodic basis, for example, once a day. This enables to keep track of the updates in contacts list and grouping created in the user's client terminal which also may synchronize with the user's email. According to an aspect of the present disclosure, the AHU may maintain multiple contacts lists corresponding to different users along with their phone number and email information. According to an aspect of the present disclosure, the contacts list in the AHU may be edited manually by the user by interacting with the AHU user interface, such a touch screen. The identity, e.g., a phone number, an Internet Protocol (IP) address, etc., of an AHU may be associated with the identity of a client terminal such that the calls and messages intended for a client terminal identity may be received by the AHU and handled according to the aspects of the present disclosure.

According to an aspect of the present disclosure, dedicated sensors may be added in one or more, including all, passenger seats to determine whether a passenger is occupying a seat or not for the purposes of group based notification control method. According to an aspect of the present disclosure, the sensor for passenger occupancy detection may comprise a weight sensor and a sensor for detecting whether seatbelt is fastened to its buckle or not. Together, the weight sensor and the seatbelt buckle fastening detection sensor may help determine whether there is a passenger or non-human load present in a seat. For example, if some configurable weight, e.g., 50 pounds or higher, is detected in a seat but the seat belt is not fastened, this may be an indication of non-human load in the seat. For example, if some weight is detected in a seat and the seat belt is fastened, this may be an indication of a passenger in the seat.

The group based notification control according to the aspects of the present disclosure may be applicable to scenario where the automobile may be driven fully autonomously, semi-autonomously or by a human driver.

By way of example only, the above-described method may be implemented in a receiver, e.g., a user device such as a wireless mobile station (MS) 12 as shown in FIG. 1.

Figure 5:
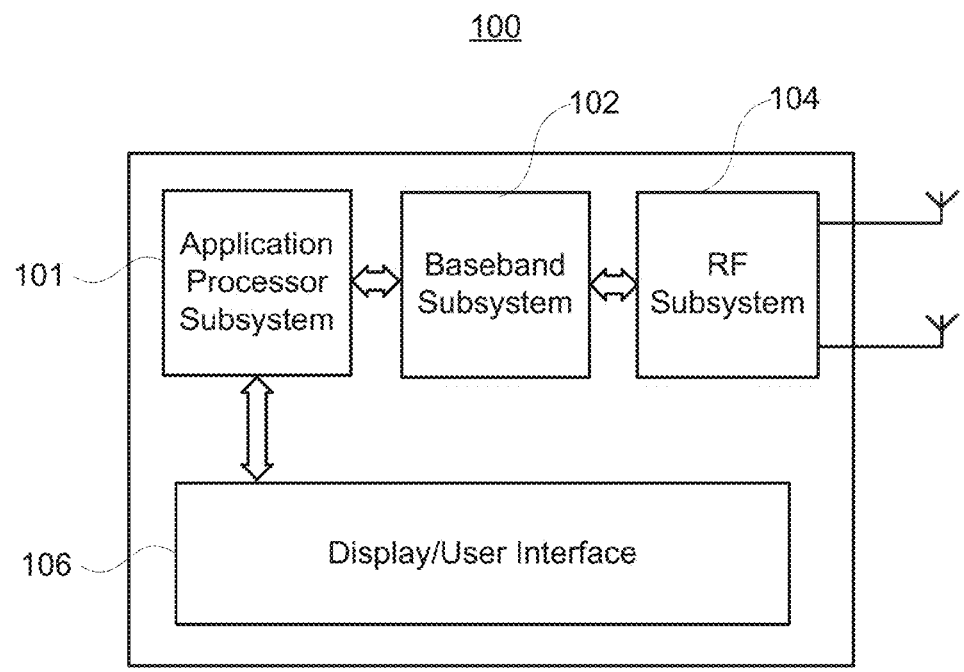
FIG. 5 illustrates a wireless mobile station diagram, which may be employed with aspects of the disclosure described herein.

As shown in FIG. 5, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 6:
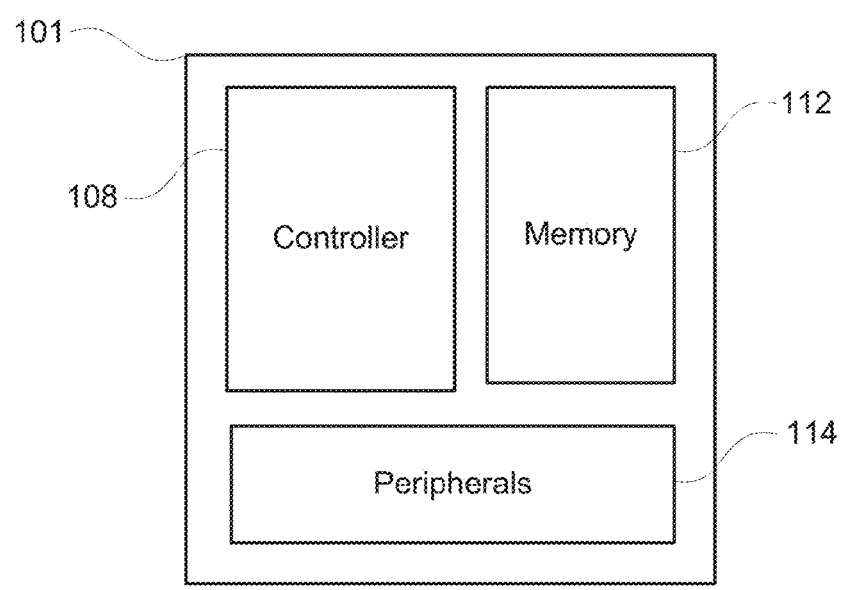
FIG. 6 illustrates an application processor subsystem for a wireless mobile station, which may be employed with aspects of the disclosure described herein.
Figure 7:
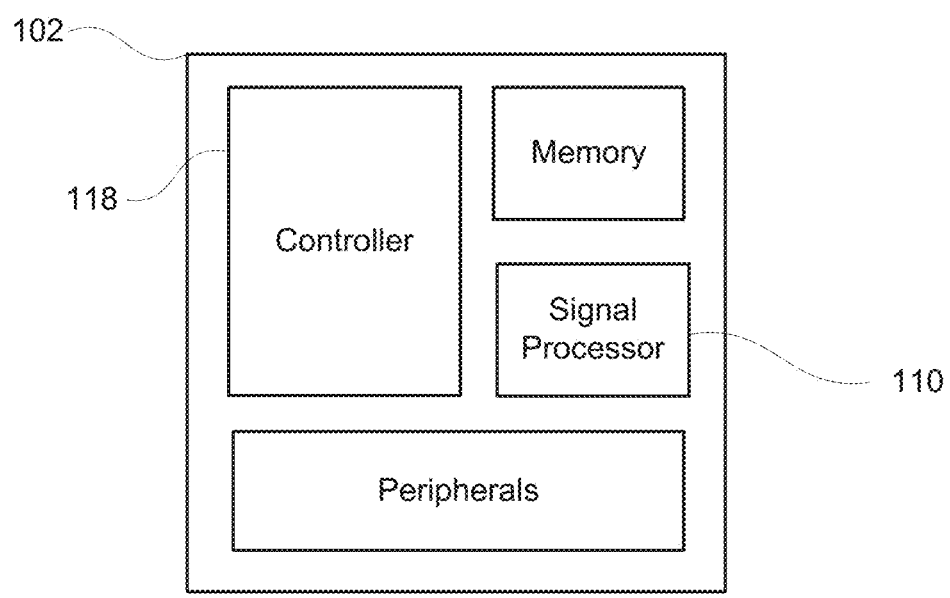
FIG. 7 illustrates a baseband subsystem for a wireless mobile station, which may be employed with aspects of the disclosure described herein.
Figure 8:
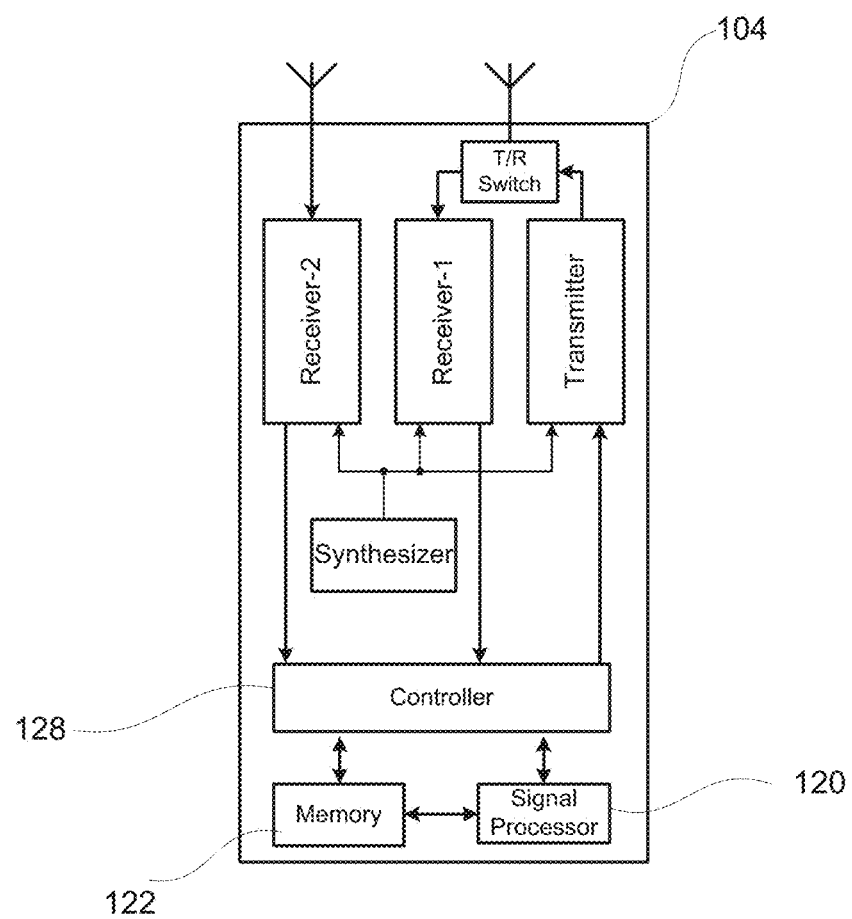
FIG. 8 illustrates a Radio Frequency (RF) subsystem for a wireless mobile station, which may be employed with aspects of the disclosure described herein.

The application processor subsystem 101 as shown in FIG. 6 may include a controller 108 such as a microcontroller or other processor. The baseband subsystem 102 as shown in FIG. 7 may include a controller 118 such as a microcontroller or other processor. The RF subsystem 104 as shown in FIG. 8 may include a controller 128 such as a microcontroller or other processor. The controller 108 desirably handles overall operation of the MS 100. This may be done by software or firmware running on the controller 108. Such software/firmware may embody any methods in accordance with the aspects of the present disclosure.

In FIG. 7 the peripherals 114 such as a full or partial keyboard, video or still image display, audio interface, etc. may be employed and managed through the controller 108.

Aspects of the present disclosure may be implemented in firmware of the controller 108 of the application processor and/or the controller 118 of the baseband subsystem as shown in FIG. 5. In another alternative, aspects of the present disclosure may also be implemented as a combination of firmware and hardware of the application processor subsystem 101 and/or the baseband subsystem 102. For instance, signal processing functionality of any or all of the FIG. 7 may be implemented in firmware and/or software, which is executed by the system hardware. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The various aspects of the disclosure described herein provide a new and more efficient method of processing for wireless client terminals. And this may lead to improved performance of such portable communication devices in cellular communications systems.

The consumer electronics devices that may use this disclosure may include smartphones, tablets, laptops, gaming consoles, cameras, video camcorders, TV, car entertainment systems, etc.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for controlling a notification at a first device, in which the first device is of a wireless communication network and permanently installed in a vehicle, the method comprising:
    controlling, by a processing device at the first device,
    setting at least one group of contacts;
    setting a selected preconfigured action, among a plurality of preconfigured actions, to be taken by the first device when a predetermined type of communication is received at the first device from any contact of the at least one group of contacts;
    receiving information indicating presence of a passenger in the vehicle; and
    when the predetermined type of communication from any contact of the at least one group of contacts is received at the first device from the wireless communication network, notification control for the first device according to the selected preconfigured action and the information indicating presence,
    in which the notification control is of notification processing of the received predetermined type of communication and according to a determination of, when a user of the first device is determined to be in the vehicle, whether the information indicating presence indicates another passenger is detected as present in the vehicle.

2. The method of claim 1, wherein the predetermined type of communication is an incoming call or text.

3. The method of claim 1, wherein the plurality of preconfigured actions includes a first preconfigured action to disable announcement and display of incoming caller information and enable an option to accept or ignore a call, a second preconfigured action to reject the call with an autonomous text message response, and a third preconfigured action to route the call to voicemail.

4. The method of claim 1, further comprising:
    controlling, by the processing device, adding a first contact to a first group of contacts of the at least one group of contacts, removing a second contact from the first group, modifying a third contact of the first group, deleting the first group or adding another group of contacts to the at least one group of contacts.

5. The method of claim 1, further comprising:
controlling, by the processing device, when a new contact is added to a contacts list at the first device, generating at the first device a prompt requesting a response by the user of the first device whether to add the new contact into any group of the at least one group of contacts.

6. The method of claim 1,
wherein the vehicle is an automobile and the information indicating presence is based on second information indicating passenger presence from a second device which is installed in the automobile.

7. The method of claim 6, wherein the second information indicating passenger presence is communicated over a direct interface between the first device and the second device.

8. The method of claim 6, further comprising:
controlling, by the processing device,
when the information indicating presence indicates no other passenger is in the automobile, enabling caller name and number announcements and reading a predetermined incoming message aloud, and
when the information indicating presence indicates the another passenger is in the automobile, enabling caller name and number announcements and reading the predetermined incoming message aloud only when an incoming call or message is from any contact of a first group of contacts of the at least one group of contacts, wherein the first group is associated with a selected first preconfigured action of performing caller name and number announcements and reading the predetermined incoming message aloud.

9. The method of claim 6, further comprising:
controlling, by the processing device, determining whether the another passenger is present in the automobile periodically based on the information indicating presence.

10. The method of claim 6, further comprising:
controlling, by the processing device, determining whether the another passenger is present in the automobile based on an automobile door open close event notification indicated in the information indicating presence.

11. The method of claim 1,
wherein the information indicating presence indicates at least one of a position of a gear shifter of the vehicle or running state of an engine of the vehicle.

12. The method of claim 1, further comprising:
controlling, by the processing device, when information indicating activation of a navigation system of the vehicle with a predetermined destination is determined to be indicated in the information indicating presence, activation of selective announcement of an incoming call and reading a predetermined incoming message aloud when the user of the first device is an only occupant in the vehicle.

13. The method of claim 1, wherein the information indicating presence indicates use, by an occupant in a rear seat of the vehicle, of the first device for rendering an entertainment program.

14. The method of claim 1, wherein the information indicating presence indicates at least one of an external environmental condition or an internal environmental condition of the vehicle.

15. The method of claim 1,
wherein the at least one group of contacts includes first and second groups of contacts,
wherein the first group is associated with a first selected preconfigured action to control announcement of an incoming call and reading a predetermined incoming message aloud based on privacy, and
wherein the second group is associated with a second selected preconfigured action to control announcement of the incoming call and reading the predetermined incoming message aloud based on whether a navigation system of the vehicle is in use.

16. The method of claim 15,
wherein the at least one group of contacts includes third and fourth groups of contacts,
wherein the third group includes is associated with a third selected preconfigured action to control announcement of the incoming call and reading the predetermined incoming message aloud when a name or originating source of the incoming call or the predetermined incoming message is not determinable at the first device, and
wherein the fourth group includes is associated with a fourth selected preconfigured action to control announcement of the incoming call and reading the predetermined incoming message aloud when a determination is the incoming call or the predetermined incoming message is from an international phone number.

17. The method of claim 16, wherein the incoming call or the predetermined incoming message is determined to be from an international phone number based on a country code of a given mobile network from which the first device is receiving wireless communication service and a comparison of the country code of the given mobile network with a country code of the incoming call or the predetermined incoming message.

18. The method of claim 1, further comprising:
controlling, by the processing device,
receiving, as input from the user of the first device, information indicating a group type of passengers in the vehicle; and
the notification control for the first device according to the selected preconfigured action, based on the group type.

19. The method of claim 1, further comprising:
controlling, by the processing device, determining, at each vehicle door open and close event or gear shifter being in a parking position event indicated in the information indicating presence, passenger occupancy in the vehicle and type of group of passengers.

20. The method of claim 1,
wherein a first notification control for the first device is performed according to a first selected preconfigured action associated with a first group of contacts of the at least one group of contacts, and
the method further comprising:
controlling, by the processing device, when an incoming call or a predetermined incoming message is received at the first device from a contact belonging to the first group,
performing the first notification control for the first device, and
generating at the first device a notification indicating a determination that an incoming call or a predetermined incoming message belongs to the first group and criteria of the first selected preconfigured action.

21. The method of claim 20, further comprising:
controlling, by the processing device, when the notification is generated, generating at the first device a second notification indicating an option to override the first notification control.

22. The method of claim 1, further comprising:
controlling, by the processing device, generating a decision table for determining a first notification control for the first device, the decision table being based on (1)

first information from the user of the first device about a plurality of groups of contacts and respective associated selected preconfigured actions, (2) second information about at least one of passenger occupancy, a door open/close event, an engine start/stop event, gear shifter position or status of use of a navigation system or entertainment system, (3) third information from the internet about an external environmental factor, and (4) fourth information about safety and operational condition of the vehicle.

23. The method of claim 22, wherein the decision table includes priority information for each of the first information, the second information, the third information and the fourth information.

24. The method of claim 23,
wherein the first notification control is determined in accordance with the first information, the second information, the third information and the fourth information and the priority information respectively of the first information, the second information, the third information and the fourth information, and
the method further comprising:
controlling, by the processing device, performing the first notification control for the first device.

25. The method of claim 24, further comprising:
controlling, by the processing device, notifying, at the first device, information about the first notification control and a second notification indicating an option to override the first notification control.

26. The method of claim 1, wherein the information indicating presence includes sensor information from a sensor of a passenger seat of the vehicle, in which the sensor information indicates whether a given passenger is occupying the passenger seat.

27. The method of claim 26, wherein the sensor includes at least one of a weight sensor or a second sensor for detecting whether a seatbelt is fastened to a buckle.

28. The method of claim 26, further comprising:
controlling, by the processing device, determining, based on the sensor information, whether the given passenger or a non-human load is in the passenger seat.

29. The method of claim 26, wherein the further comprising:
controlling, by the processing device,
determining a non-human load is in the passenger seat when, based on the sensor information, at least a predetermined weight is detected as being in the passenger seat and a seat belt of the passenger seat is determined not to be fastened to a buckle, and
determining the given passenger is in the passenger seat when, based on the sensor information, at least a predetermined minimum weight is detected as being in the passenger seat and a seat belt of the passenger seat is determined to be fastened to the buckle.

30. The method of claim 1, wherein the notification control for the first device is controlled, when a second device of the wireless communication network is determined to be communicatively coupled with the first device via a communication link.

31. The method of claim 1, wherein the communication link is a Bluetooth link.

32. A method for controlling a notification at a first device, in which the first device is permanently installed in a vehicle and configured for communicatively coupling to a wireless client device of a wireless communication network over a first communication link and to a second wireless communication network over a second communication link, the method comprising:
controlling, by a processing device at the first device,
acquiring, over the first communication link, user identification information from the wireless client device;
acquiring, over the second communication link, at least one group of contacts using the user identification information;
setting a selected preconfigured action, among a plurality of preconfigured actions, to be taken by the first device, when caller information received from the wireless client device over the first communication link indicates a predetermined type of communication is received at the wireless client device from any contact of the at least one group of contacts;
receiving information indicating presence of a passenger in the vehicle; and
when the predetermined type of communication from any contact of the at least one group of contacts is determined to be received at the wireless client device from first caller information received from the wireless client device over the first communication link, notification control for the first device according to the selected preconfigured action and the information indicating presence,
in which the notification control is of notification processing of the received predetermined type of communication and according to a determination of, when a user of the first device is determined to be in the vehicle, whether the information indicating presence indicates another passenger is detected as present in the vehicle.

33. The method of claim 32, wherein the user identification information includes at least one of a phone number, an email address or password.

34. The method of claim 32, wherein the first communication link is over a Bluetooth link or a wired link, and wherein the second communication link is over a Wireless Wide Area Network (WWAN) link.

35. The method of claim 34, wherein the at least one group of contacts is acquired over the Internet.

36. The method of claim 32, further comprising:
controlling, by the processing device at the first device, periodically updating the at least one group of contacts, by periodically accessing over the second communication link, using the user identification information, information indicating the at least one group of contacts.

37. The method of claim 32, further comprising:
controlling, by the processing device at the first device, modifying the at least one group of contacts, based on information from interaction by the user with a user interface device of the first device.

38. The method of claim 37, wherein the user interface device is a touch screen.

39. The method of claim 32, wherein the vehicle is an at least partially autonomous automobile or a non-autonomous automobile.

40. The method of claim 32, further comprising:
wherein the information indicating presence is based on second information indicating passenger presence from a second device which is installed in the vehicle.

41. An apparatus for controlling a notification at a first device, in which the first device is of a wireless communication network and permanently installed in a vehicle, the apparatus comprising:

circuitry configured to control, at the first device,
  setting at least one group of contacts;
  setting a selected preconfigured action, among a plurality of preconfigured actions, to be taken by the first device when a predetermined type of communication is received at the first device from any contact of the at least one group of contacts;
  receiving information indicating presence of a passenger in the vehicle; and
  when the predetermined type of communication from any contact of the at least one group of contacts is received at the first device from the wireless communication network, notification control for the first device according to the selected preconfigured action and the information indicating presence,
  in which the notification control is of notification processing of the received predetermined type of communication and according to a determination of, when a user of the first device is determined to be in the vehicle, whether the information indicating presence indicates another passenger is detected as present in the vehicle.

42. A wireless communication device comprising:
  a receiver to receive a signal from a wireless communication network; and
  a processing device configured for controlling a notification at the wireless communication device, in which the wireless communication device is permanently installed in a vehicle,
  wherein the processing device is configured to control:
  setting at least one group of contacts;
  setting a selected preconfigured action, among a plurality of preconfigured actions, to be taken by the wireless communication device when a predetermined type of communication is received at the wireless communication device from any contact of the at least one group of contacts;
  receiving information indicating presence of a passenger in the vehicle; and
  when the predetermined type of communication from any contact of the at least one group of contacts is received at the wireless communication device from the wireless communication network, notification control for the wireless communication device according to the selected preconfigured action and the information indicating presence,
  in which the notification control is of notification processing of the received predetermined type of communication and according to a determination of, when a user of the wireless communication device is determined to be in the vehicle, whether the information indicating presence indicates another passenger is detected as present in the vehicle.

43. An apparatus for controlling a notification at a first device, in which the first device is permanently installed in a vehicle and configured for communicatively coupling to a wireless client device of a wireless communication network over a first communication link and to a second wireless communication network over a second communication link, the apparatus comprising:
  circuitry configured to control, at the first device,
  acquiring, over the first communication link, user identification information from the wireless client device;
  acquiring, over the second communication link, at least one group of contacts using the user identification information;
  setting a selected preconfigured action, among a plurality of preconfigured actions, to be taken by the first device, when caller information received from the wireless client device over the first communication link indicates a predetermined type of communication is received at the wireless client device from any contact of the at least one group of contacts;
  receiving information indicating presence of a passenger in the vehicle; and
  when the predetermined type of communication from any contact of the at least one group of contacts is determined to be received at the wireless client device from first caller information received from the wireless client device over the first communication link, notification control for the first device according to the selected preconfigured action and the information indicating presence,
  in which the notification control is of notification processing of the received predetermined type of communication and according to a determination of, when a user of the first device is determined to be in the vehicle, whether the information indicating presence indicates another passenger is detected as present in the vehicle.

44. A wireless communication device comprising:
  a receiver to receive a signal from a wireless communication network; and
  a processing device configured for controlling a notification at the wireless communication device, in which the wireless communication device is permanently installed in a vehicle and configured for communicatively coupling to a wireless client device of a wireless communication network over a first communication link and to a second wireless communication network over a second communication link,
  wherein the processing device is configured to control
  acquiring, over the first communication link, user identification information from the wireless client device;
  acquiring, over the second communication link, at least one group of contacts using the user identification information;
  setting a selected preconfigured action, among a plurality of preconfigured actions, to be taken by the wireless communication device, when caller information received from the wireless client device over the first communication link indicates a predetermined type of communication is received at the wireless client device from any contact of the at least one group of contacts;
  receiving information indicating presence of a passenger in the vehicle; and
  when the predetermined type of communication from any contact of the at least one group of contacts is determined to be received at the wireless client device from first caller information received from the wireless client device over the first communication link, notification control for the wireless communication device according to the selected preconfigured action and the information indicating presence,
  in which the notification control is of notification processing of the received predetermined type of communication and according to a determination of, when a user of the wireless communication device is determined to be in the vehicle, whether the information indicating presence indicates another passenger is detected as present in the vehicle.

* * * * *